3,086,890
COLD WATER SOLUBLE AMYLOSE
Anatole Sarko, Irvington-on-Hudson, Benjamin R. Zeitlin, Spring Valley, and Felix J. Germino, Peekskill, N.Y., assignors to General Foods Corporation, White Plains, N.Y., a corporation of Delaware
No Drawing. Filed Oct. 6, 1959, Ser. No. 844,635
11 Claims. (Cl. 127—69)

This invention relates to amylose preparations, and more particularly to the treatment or modification of amylose to produce a dry product characterized by having improved properties of solubility in water and of rapid gel formation. Among other applications the product finds particular use in making instant foods, such as instant gravies, gel-type puddings, and the like; as a substitute in some cases for gelatin, and in making non-foods where cold-water solubility is required, as in paper and textile protective sizes and coatings.

As is known, amylose is obtained from starch and comprises a linear or open-chain molecule formed from up to 5000 glucose units attached to each other by end-to-end linkages known as alpha-1,4-glucosidic bonds. Aqueous solutions of amylose are very unstable, tending to precipitate out (or retrograde) spontaneously to form stable, insoluble crystals of amylose. In the case of solutions containing more than 3% of amylose, the process of retrogradation produces a gel. (By retrogradation is meant the spontaneous precipitation of amylose from a solution of the same to form stable, insoluble crystals, and the crystals are said to be retrograded.) Such precipitated or retrograded amylose cannot be solubilized in water unless autoclaving techniques are used. After autoclaving, the resulting amylose solution, on standing, will again precipitate amylose crystals. Further autoclaving is necessary to solubilize these, and so on. Repeated autoclaving, however, produces undesirable destruction or degradation of the amylose chains.

According to the invention, an amylose solution produced by autoclaving is subjected to a rapid drying step under carefully controlled conditions to produce the amylose product. It has been found that such a product may be solubilized in cold or hot water by simply blending the same therewith, thus eliminating the necessity for further autoclaving. The provision of such an amylose substantially widens its field of utility. Not only may the amylose product be solubilized in water, but it is also capable of forming spontaneous irreversible gels from cold or hot solutions, these gels having application in making gravies, puddings, and like products.

It may be noted that aqueous solutions of the amylose product are either true solutions or at least colloidal solutions as they do not show particulate matter when examined under the microscope. Although the term "solution" is used with reference to a mixture of water and autoclaved amylose per se, that is, amylose that has not yet been subjected to drying, such use should be understood as covering solutions and also all dispersions showing no particulate matter under the microscope. The term "particulate matter" refers to the presence of separate particles in the solution.

Considering the invention in more detail, it comprises first subjecting the amylose starting material to conditions of temperature, pressure, and time sufficient to solubilize it to produce solutions containing at least 0.1% by weight of amylose, and preferably 0.1 to 25%. Generally, any suitable amylose may be treated or modified, as described herein, which is substantially hot- and cold-water insoluble. Thus, it may be completely crystalline or amorphous, and it may have had substantially any previous processing. It can have any suitable chain length, as indicated by the intrinsic viscosity range noted below, and the chain lengths may be substantially the same or widely different. In some cases, it may have some cold-water solubility, say up to 1% by weight, which, however, is not sufficient to give a gel on standing or cooling. Advantages of the invention are particularly apparent in cases where the starting amylose is completely retrograded, that is, is insoluble in water at any temperature under normal pressure.

The average intrinsic viscosity of the starting amylose should range from 1.3 to 5.0, although preferably it is 1.3 to 2.9, and particularly 2.3 to 2.9. It may be added that the intrinsic viscosity of the starting amylose may remain the same during autoclaving or it may decrease owing to degradation. The amylose may be derived from any suitable source including amylose-containing starches such as those from potato, tapioca, wheat, etc. Also, the amylose need not be pure amylose but may have mixed therewith such materials as amylopectin, dextrins, gums, proteins, and the like, all of which are more or less inert to the amylose under the conditions of the autoclaving and subsequent steps. By "inert" materials is meant those that do not react with the amylose and that do not interfere with the drying step to be described or in the subsequent gel-forming step. It is preferred, in the case of these impure amylose materials, that the amylose content thereof shall be at least 60% by weight.

The preferred solubilizing conditions for a fully retrograded starting amylose comprise heating of the amylose at a temperature of 160° C. and a pressure of about 100 p.s.i.g. for a time of up to about 5 minutes. It is not clearly known what occurs to the amylose during such treatment outside of simple disaggregation, although it is believed that some degradation of the molecule takes place, random points in the molecule undergo hydrolysis, some oxidation may occur, etc. Considering such changes, except disaggregation, as a degradation, it is desirable that the extent of the degradation be held to a minimum, as by using as low an autoclaving temperature for as short a time as possible. By "disaggregation" is meant the phenomenon of the breaking up of the agglomerates that are more or less characteristic of amylose without degrading the amylose molecule. These agglomerates are not believed to involve a chemical combination. The extent or amount of the treatment may suitably be measured in terms of the resulting solubility of the amylose undergoing treatment; in other words, the treated amylose should be capable of forming solutions containing about 0.1 to 25% by weight of amylose, preferably 2 to 10%, or 3 to 6%. Preferably, contact with air and/or oxygen of the solution undergoing treatment should be avoided, as by bubbling nitrogen therethrough. The conditions of the treating or solubilization step, for starting amyloses in general, are variable. Thus, the temperature may range from just above boiling, say about 220° F., to 375° F.; the pressure corresponds to the temperature and usually varies from about 5 to 140 p.s.i.g.; and the time may be 1 to 60 minutes, preferably 5 to 50 minutes, or 30 to 45 minutes. The last-mentioned condition of time extends from the beginning of the heating, includes a holding period at the desired temperature, and terminates after cooling the material to a desired temperature and removing the same from the autoclave. Holding periods at the desired elevated temperature usually range from 1 to 5 minutes, but can be longer, say up to 30 minutes.

Where the starting amylose is not fully retrograded, the solubilizing conditions may be less than the upper limits of the foregoing ranges. For fully retrograded starting amylose, the preferred temperature is 310 to 330° F.; the preferred pressure is 90 to 110 p.s.i.g.; and the preferred time is 25 to 35 minutes. As will be understood, these conditions are interdependent. For example, at higher temperatures, the time may be shorter. Whatever conditions are selected, the resulting product should have a water solubility within the range noted. The autoclaved amylose should also have a minimum intrinsic viscosity in the range of 1.3–1.4.

Although it is indicated that the autoclaved material is a solution, or is solubilized, it will be understood, as described above, that such solution precipitates amylose on cooling, i.e., it retrogrades.

The hot autoclaved solution is immediately evaporated and dried by introducing the same slowly to the nip of a pair of slowly rotating, hollow, heated drum rolls. The solution is introduced to the rolls in the form of a wide stream, the width of the stream being substantially the same as the length of the rolls. The rolls should be spaced apart a distance of less than 0.001 inch. They are heated by recirculating steam through them so that the outer surfaces are kept at a temperature of about 110 to 220° C., preferably about 145° C. Usually only a single rotation of the rolls is required to drive off the water from the solution, or in terms of time, about 40 to 75 seconds. As the water evaporates, the amylose solidifies in the form of a thin white sheet or sheet-like structure that is characterized by its porosity and its loose, lacy, appearance and feel. The sheet-like product is removed from the rolls by means of sharp doctor blades.

The dimensions of the rolls are variable. They are suitably made of stainless steel but can be of other metals, particularly ordinary steel with a deposit of chromium plate or other metal thereon.

After removal of the sheet-like structure from the drying rolls, it is readily reducible to a dry, porous, white, fluffy, amylose powder. If desired, the sheet-like structure may be dissolved in water directly without first being reduced to powder, it having been found that by virtue of its form, the structure is readily accessible to water and clumping of the amylose solution is lessened or avoided. The amylose powder is characterized by having an amorphous X-ray diffraction diagram and an average intrinsic viscosity of 1.3 to 2.9, and preferably 2.3 to 2.9. The product comprises irregularly-shaped particles having a particle size in the range say, of about 25 to 500 microns. The product is odorless, bland to the taste, has a smooth mouth feel with no chalkiness, and is further characterized by being non-toxic, digestible, and nutritious. It exhibits good stability when stored at room temperature for months, being capable, after such storage, of being made up into a satisfactory solution, gel, or pudding. Dry pudding preparations incorporating the amylose product also have good stability during storage.

A small amount of moisture may be present which is usually 1 to 2% by weight but which may be higher, going up to about 5% by weight.

The amylose is readily soluble in cold water in a matter of seconds. It forms a cold water solution which is distinctive by being non-clumping. By cold water is meant water at room temperatures and lower, going down to freezing temperature. The product is also soluble in cold milk, forming gels on standing of the solution. The amylose product is, of course, soluble in hot water and hot milk.

Gels may be formed from solutions containing 3 to 10% by weight of the amylose product; preferably they are formed from cold water solutions containing 4 to 6% by weight of amylose, these latter gels being preferred for use in or as foods. The gels are characterized by their complete lack of grittiness, giving a smooth mouth feel. The higher the concentration of amylose in the solution, the faster is the formation of the gel and the firmer is its structure. The gel is a physical type of gel, that is, the amylose forms a gel by virtue of a swelling or water-absorption phenomenon, and subsequent aggregation of amylose molecules. The gel is readily moldable and demoldable, and after being molded it will hold its shape. It is further characterized by being a short or clean-cutting gel and is relatively non-pasty and non-stringy.

Besides being useful for foods, the amylose product is suitable as a base for solid bacteriological culture media. For example a 5% dispersion can be autoclaved in Petri dishes or test tubes, allowed to cool, and the resulting sterile gel can be used as a base for culturing microorganisms.

In some cases the amylose product may be employed as a substitute for gelatin, agar, pectins, alginates, and other gums.

*Example 1*

This example illustrates the preparation of drum dried, cold-water soluble amylose. About 60 g. of potato amylose and 940 cc. of water were blended briefly in a Waring Blendor, then charged to a Parr reaction vessel where the mixture was heated to a temperature of 160° C. and a pressure of 100 p.s.i.g. Immediately after reaching the stated temperature-pressure conditions, the contents of the reaction vessel were cooled to about 90° C., after which the vessel was opened and the contents removed. The entire heating and cooling operations required 30 minutes. The product comprises a 6% solution of amylose and water. This solution was immediately poured into the pinch of a pair of stainless steel rolls, each measuring 18 inches in length and having a diameter of 10 inches. The roll surfaces were steam heated (60 p.s.i.g. steam) to a surface temperature of 145° C. The rolls were spaced apart less than 0.001 inch. The contact time of the amylose solution with the heated rolls was kept to a minimum, approximately 60 seconds. The dry amylose product was removed from the rolls by means of sharp doctor blades and was in the form of a thin, white, porous, lacy, sheet-like structure, which was readily reducible to a dry, porous, white, fluffy, amylose powder. The powder had a particle size in the range of about 20 to 500 microns, possessed an amorphous X-ray diffraction diagram, and an intrinsic viscosity value of 2.8. The powder was easily soluble in cold water; thus, when 5 g. of the powder were blended with 95 cc. of water at 4° C. for approximately 30 seconds using a hand blender, there resulted a substantially clear, very viscous solution that solidified within 10 minutes to a strong, opaque-white, smooth-textured, irreversible, short, non-stringy, clean-cutting, easily demoldable gel.

*Example 2*

This example illustrates the use of a drum-dried amylose preparation in an instant pudding. Five gms. of the drum-dried amylose as prepared in Example 1 were mixed with 10 gms. of sugar and suitable amounts of vanilla flavoring and food color and the solids were dispersed in 100 cc. of cold milk (kept in a refrigerator), using a hand blender for approximately 30 seconds. The resulting mixture was in the form of a viscous solution which gelled within 15 minutes to a smooth-textured, creamy, non-stringy, pleasant tasting pudding. The pudding was free of syneresis and surface skin, and did not alter substantially during standing for 24 hours in the refrigerator.

It has been found that the addition of amylopectin to the amylose product, prior to gel formation, can increase the viscosity of the resulting gel and reduce any tendency for syneresis to occur. In addition, the rigidity of the gel may be reduced by means of the amylopectin. Suitable amounts of amylopectin may be used, say up to 20% by weight based on the amylose. The amylopectin may be added at any suitable point in the process, and if desired, may be incorporated with the starting amylose. Pregelatinized starch is also useful in place of amylopectin.

The product is further useful in industrial applications as a starting material or intermediate for the preparation of various amylose derivatives, being particularly valuable where a cold-water soluble material is desired. Such a material enables the derivative-forming reactions to be carried out at low temperatures owing to its cold-water solubility. As is apparent, such cold-water soluble material, when employed in these low temperature reactions, does not undergo heat degradation as in the case of conventional amylose.

In connection with the starting amylose material, it may be noted that those materials which are soluble in hot water, say water at 60° C. or above, to give concentrations of about 0.1 to 25% of amylose by weight and having an average intrinsic viscosity of 1.3 to 5.0, can be introduced directly to the drying step. In other words, being sufficiently hot-water soluble, they need not be subjected to the autoclaving step.

The intrinsic viscosity of the foregoing amylose materials and products was determined by the following procedure: an exactly weighed amount of amylose, preferably 0.5 g., was dissolved in 100 ml. of 0.5 normal sodium hydroxide at a temperature of 0 to 2° C. The solubilization was helped by mechanical agitation. The resulting solution was filtered through glass wool and exactly 8 ml. of it was placed in a Connon-Ubbelohde dilution viscometer No. 100, equilibrated at 30.10° C. The flow times of the solution were determined in triplicate and further dilutions of the same solution were made right in the viscometer with 0.5 normal sodium hydroxide. The flow times of all diluted solutions were also determined in triplicate and at amylose concentrations of 0.4, 0.3, 0.2, and 0.1% by weight. The specific viscosities were calculated from the flow times by means of the following formula:

$$\frac{\text{Specific viscosity}}{C} = \frac{t - t_0}{t_0 \cdot C}$$

(where $t$ is the flow time of the solution in seconds, $t_0$ is the flow time of the solvent in seconds, and C is the concentration of amylose in weight percent). The specific viscosities were plotted versus the amylose concentrations and the resulting straight line was extrapolated to 0% concentration. The viscosity at 0% concentration is the intrinsic viscosity. As is known, intrinsic viscosity is related to the chain length of the amylose.

It is to be understood that the invention is not restricted to the specific details of the foregoing description but is capable of obvious variations thereof without departing from its scope.

The following is claimed:

1. Method of producing dry cold water-soluble amylose which comprises subjecting a mixture of water and substantially cold water-insoluble amylose having an average intrinsic viscosity in the range of 1.3 to 2.9 to a temperature ranging from just above boiling to 375° F. and a pressure of about 5 to 140 p.s.i.g. for a time of 1 to 60 minutes, thereby forming a hot aqueous solution containing about 0.1 to 25% by weight of amylose; subjecting the amylose solution immediately to drying by introducing the same into the nip of a pair of rotating heated rolls, heating and maintaining the surfaces of said rolls at a temperature of about 110 to 200° C., rotating said rolls at a slow speed to maintain said amylose solution in contact with said heated roll surfaces for a time of 40 to 75 seconds to dry the amylose; and recovering the dried amylose in the form of a thin, white, porous, lacy, sheetlike structure, said structure being readily reducible to a dry, porous, white fluffy amylose powder.

2. Method of producing dry cold water-soluble amylose which comprises subjecting a mixture of water and substantially cold water-insoluble amylose having an average intrinsic viscosity in the range of about 1.3 to 5.0 to autoclaving to form a hot aqueous solution containing about 0.1 to 25% by weight of amylose, evaporating the hot solvent by introducing the solution into the nip of a pair of rotating heated rolls, maintaining the surfaces of said rolls at a temperature of about 110 to 200° C., rotating said rolls at a slow speed to maintain said amylose solution in contact with at least one said heated roll surface for a time of 40 to 75 seconds to evaporate the solvent and dry the amylose, and recovering the dried amylose in the form of a thin, white, porous, lacy, sheetlike structure, said structure being reducible to a dry, porous, white, fluffy, amylose powder.

3. Method of producing dry cold water-soluble amylose which comprises forming an aqueous dispersion of a material containing at least 60% amylose having an intrinsic viscosity of about 1.3 to 5.0, autoclaving the dispersion to form an aqueous, fluid, non-tacky solution containing about 0.1 to 25% amylose, introducing the solution into the nip of a pair of closely spaced rotating heated rolls, and maintaining the solution in contact with said heated rolls for a time sufficient to evaporate the solvent and dry the amylose.

4. A method as claimed in claim 3, in which the fluid amylose solution has an average intrinsic viscosity of from about 2.3 to 2.9.

5. A method as claimed in claim 3, in which the contact surfaces of said heated rolls are maintained at a temperature of about 145° C.

6. A method as claimed in claim 3, in which both of said heated rolls rotate at about 40 to 75 seconds per rotation.

7. A method as claimed in claim 3, in which said fluid amylose solution is introduced into the nip of said pair of rolls at a temperature at least greater than the boiling point of said solution.

8. A method as claimed in claim 3, in which said material contains less than 20% amylopectin.

9. A cold and hot water-soluble amylose comprising a dry, porous, white, fluffy, powder containing at least 60% amylose by weight and comprising irregularly-shaped particles having an amorphous X-ray diffraction diagram and an average intrinsic viscosity of 1.3 to 2.9, said amylose powder being further characterized by being solubilizable in cold aqueous liquids in 10 to 60 seconds and also in hot aqueous liquids in concentrations of up to at least 10% by weight and by forming a spontaneous firm, smooth-textured, white, opaque irreversible gel from cold solution, said gel forming within 5 to 10 minutes from solutions containing at least 4 to 5% by weight of amylose, and said gell being capable of forming puddings having a smooth, non-gritty mouth feel.

10. The amylose of claim 9 having admixed therewith about 1 to 20% by weight of amylopectin for reducing syneresis of said gel and increasing the rigidity thereof.

11. The amylose of claim 9, said amylose powder having a particle size in the range of about 25 to 500 microns.

References Cited in the file of this patent

UNITED STATES PATENTS

| 2,464,081 | Hansen et al. | Mar. 8, 1949 |
| 2,853,484 | Lolkema et al. | Sept. 23, 1958 |

FOREIGN PATENTS

| 706,622 | Great Britain | Mar. 31, 1954 |
| 816,049 | Great Britain | July 8, 1959 |

OTHER REFERENCES

Serial No. 397,867, Moller: (A.P.C.), published May 4, 1943.